US006640308B1

(12) United States Patent
Keyghobad et al.

(10) Patent No.: US 6,640,308 B1
(45) Date of Patent: Oct. 28, 2003

(54) SYSTEM AND METHOD OF POWERING AND COMMUNICATING FIELD ETHERNET DEVICE FOR AN INSTRUMENTATION AND CONTROL USING A SINGLE PAIR OF POWERED ETHERNET WIRE

(75) Inventors: Seyamak Keyghobad, Marion, MA (US); William Baker, Solana Beach, CA (US); Richard Thibault, Plainville, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/444,827

(22) Filed: Nov. 22, 1999

Related U.S. Application Data

(60) Provisional application No. 60/129,541, filed on Apr. 16, 1999, and provisional application No. 60/157,110, filed on Oct. 4, 1999.

(51) Int. Cl.[7] .................................................. G06F 1/26
(52) U.S. Cl. ....................... 713/300; 370/254; 370/257; 370/395
(58) Field of Search ................................ 370/254, 257; 390/395.52, 395.5; 713/300

(56) References Cited

U.S. PATENT DOCUMENTS

| | | | |
|---|---|---|---|
| 3,959,772 A | 5/1976 | Wakasa et al. ............... 340/167 |
| 4,633,217 A | * 12/1986 | Akano ..................... 340/310.05 |
| 4,806,905 A | 2/1989 | McGowan et al. .......... 340/310 |
| 4,918,690 A | 4/1990 | Markkula, Jr. et al. |
| 4,926,158 A | * 5/1990 | Zeigler ................... 340/310.02 |
| 5,089,927 A | * 2/1992 | Bulan et al. .................... 361/87 |
| 5,089,974 A | * 2/1992 | Demeyer et al. ........... 340/3.41 |
| 5,451,923 A | 9/1995 | Seberger et al. ........ 340/310.06 |
| 5,469,150 A | * 11/1995 | Sitte ............................ 340/3.42 |
| 5,530,377 A | * 6/1996 | Walls ............................ 326/30 |
| 5,841,360 A | 11/1998 | Binder |
| 5,909,586 A | 6/1999 | Anderson |
| 5,994,998 A | 11/1999 | Fisher et al. |
| 6,049,578 A | 4/2000 | Senechal et al. |
| 6,055,633 A | 4/2000 | Schrier et al. |
| 6,097,761 A | * 8/2000 | Buhring et al. ............. 375/257 |
| 6,115,468 A | * 9/2000 | Nicolo ........................ 379/413 |
| 6,140,911 A | 10/2000 | Fisher et al. |
| 6,175,556 B1 | * 1/2001 | Allen, Jr. et al. ........... 370/293 |
| 6,218,930 B1 | 4/2001 | Katzenberg et al. |
| 6,246,748 B1 | * 6/2001 | Yano .............................. 379/2 |
| 6,295,356 B1 | 9/2001 | De Nicolo .................. 379/413 |
| 6,348,874 B1 | * 2/2002 | Cole et al. ............. 340/825.01 |
| 6,393,050 B1 | 5/2002 | Liu ............................. 375/219 |
| 6,487,214 B1 | 11/2002 | Bachar ....................... 370/445 |

FOREIGN PATENT DOCUMENTS

| | | | |
|---|---|---|---|
| WO | WO 96/23377 | 8/1996 | .......... H04L/12/10 |
| WO | WO 98/20649 | 5/1998 | ......... H04L/12/413 |
| WO | WO 98/36518 | 8/1998 | |
| WO | WO 98/54843 | 12/1998 | ............ H04B/1/00 |

OTHER PUBLICATIONS

WO 96/23377 PCT "Multimedia System Having Central Power Source and Distribution Subsystem" Aug., 1996.
Berge, Jonas; "Using Ethernet is a no-brainer"; *The International Journal for Measurement and Control—An ISA Publication; In Tech*; pp. 36–39; Jul. 2000.
Nick Stapleton, "DTE Power via MDI", Jul. 6, 1999, United States.
G.G. Wood, "Survey of LANs and Standards", 1987.

* cited by examiner

*Primary Examiner*—Dennis M. Butler
*Assistant Examiner*—Nitin C. Patel
(74) *Attorney, Agent, or Firm*—Fish & Richardson P.C.

(57) ABSTRACT

A powered Ethernet connection is provided between two devices connected by an Ethernet connection that provides data communication between the devices. Electrical power is applied to the Ethernet connection at the first device, and extracted from the Ethernet connection at the second device. The extracted power is used to power the second device.

37 Claims, 13 Drawing Sheets

SYSTEM AND METHOD OF POWERING AND COMMUNICATING FIELD ETHERNET DEVICE FOR AN INSTRUMENTATION AND CONTROL USING A SINGLE PAIR OF POWERED ETHERNET WIRE

CROSS-REFERENCE TO RELATED APPLICATIONS

This application claims priority from U.S. Provisional Application Nos. 60/129,541 and 60/157,110, which were filed, respectively, on Apr. 6, 1999, and Oct. 4, 1999, both of which are incorporated by reference.

TECHNICAL FIELD

The invention relates to interconnecting devices for instrumentation and control.

BACKGROUND

Control systems often include intelligent field devices having digital processors. Examples of such devices include valve controllers and transmitters, such as those associated with, for example, temperature sensors, pressure sensors, and flow meters. Another type of intelligent field device is a field mounted process controller that sends control signals to, for example, a valve controller, based on process information received from one or more transmitters.

The functionality of different field devices may be incorporated into a single module. For example, a process controller, a valve controller, and a temperature sensor/transmitter may be incorporated into a single module. However, even with such consolidation of function, control systems typically require some mechanism for transmitting signals between devices, and for transmitting signals from devices to a central control station.

Due to cost constraints, connections between devices, and between the devices and a control station, are often provided using a single pair of wires in many instances, this same pair of wires is used to provide power to the devices.

Many proprietary protocols have been developed for powering field devices and transmitting signals between the devices using a single pair of wires. Two such protocols are the HART protocol and the FOXCOMM protocol.

The HART protocol specifies provision of a 4–20 mA analog control signal and a 1200 baud bidirectional digital data link on a pair of wires connected to a device. The 4–20 mA signal is used both to power the device and to provide a control signal to or from the device. The HART protocol achieves simultaneous analog and digital transmission by using a frequency shift keying (FSK) technique to overlay a bidirectional digital signal on the analog control signal.

The FOXCOMM protocol also overlays a bidirectional digital data signal on a 4–20 mA analog control and power signal. Different versions of the protocol use either 600 baud or 4800 baud digital signals. Yet another version uses the analog signal only for power delivery and transmits all information using digital signals.

SUMMARY

In one general aspect, the invention features providing a powered Ethernet connection between two devices connected by an Ethernet connection that provides data communication between the devices. Electrical power is applied on to the Ethernet connection at the first device. At the second device, the electrical power is extracted and used to power the second device.

Embodiments may include one or more of the following features. For example, the Ethernet connection may include two pairs of wires, with a first pair of wires being used to transmit data from the first device to the second device and a second pair of wires being used to transmit data from the second device to the first device. In this case, applying electrical power on to the Ethernet connection at the first device may include applying a DC voltage across the two pairs of wires by coupling a first potential to the first pair of wires and a second potential to the second pair of wires, with the DC voltage being defined as a difference between the two potentials. For example, when each pair of wires is connected to a corresponding transformer at the first device, and each transformer includes a center-tapped primary winding, coupling potentials to the pairs of wires may include applying the DC voltage between the center taps of the primary windings of the two transformers. As an alternative, a center-tapped inductor may be connected across each pair of wires at the first device, and potentials may be coupled to the pairs of wires by applying the DC voltage between the center taps of the inductors. Electrical power may be extracted at the second device through center-tapped windings of transformers of the second device, or through center-tapped inductors coupled across the pairs of wires at the second device.

The Ethernet connection also may be implemented using a single pair of wires to transmit data from the first device to the second device, to transmit data from the second device to the first device, and to provide power from the first device to the second device. In this case, applying electrical power on to the Ethernet connection at the first device may include applying a DC voltage across the pair of wires by coupling a first potential to the first wire through an inductor and coupling a second potential to the second wire through an inductor, with the DC voltage being defined as a difference between the two potentials.

Each device may be, for example, a process controller, a field device, or an Ethernet hub. A field device may be operable to sense a process condition and to transmit information about the sensed process condition using the Ethernet connection, or to control a process condition in response to a command received through the Ethernet connection.

In another general aspect, the invention features connecting a four-terminal Ethernet connection to a two-wire Ethernet connection. A device having a four-terminal Ethernet connection, the connection including a first pair of terminals for transmitting data away from the device and a second pair of terminals for transmitting data to the device is connected to a two-wire Ethernet connection for transmitting data to and from the device by a switched connection. The switched connection operating in a first mode in which the two-wire Ethernet connection is connected to the first pair of terminals and a second mode in which the two-wire Ethernet connection is connected to the second pair of terminals. The switched connection is initially set to operate in the first mode, and the two-wire Ethernet connection is monitored for data being transmitted to the device. The switched connection is set to operate in the second mode upon detection of data being transmitted to the device.

Power may be injected on to the two-wire Ethernet connection at the device for use in powering another device connected to the two-wire Ethernet connection. In addition, an impedance presented to the two-wire Ethernet connection may be changed from a first impedance when the switched connection is operating in the first mode to a second impedance when the switched connection is operating in the second mode.

In another general aspect, the invention features a field device having a powered Ethernet connection. The field device includes communications circuitry operable to communicate data over an Ethernet connection using an Ethernet protocol, power circuitry operable to extract operating power from the Ethernet connection, and process circuitry operable to sense a process condition and to transmit information about the sensed process condition using the Ethernet connection, or to control a process condition in response to a command received through the Ethernet connection.

Examples of such a field device include a device providing a temperature or pressure sensor, a flow meter, and a valve controller. The communications circuitry and the power circuitry may be operable to interface with an Ethernet connection including only a single pair of wires.

Other features and advantages will be apparent from the following description, including the drawings, and from the claims.

DETAILED DESCRIPTION

Figure 1:
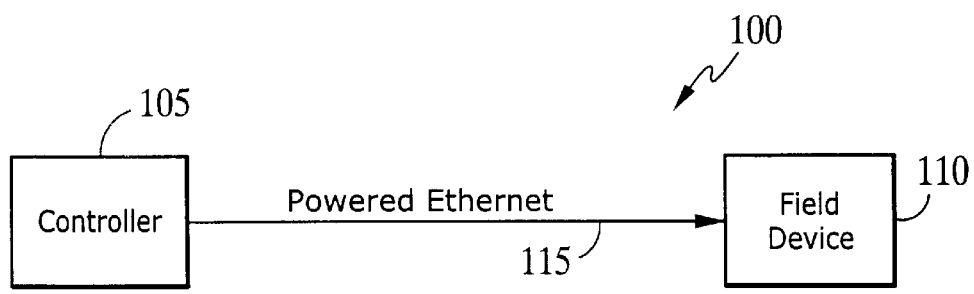
FIGS. 1–3 are block diagrams of systems using powered Ethernet connections.

Referring to FIG. 1, a control system 100 includes a controller 105 that powers and controls a remote field device 110 over a powered Ethernet connection 115. Thus, the system 100 applies the well-known and well-established Ethernet protocol to an instrumentation and control system.

The powered Ethernet connection 115 may be provided by modifying connections to existing wiring of a system employing a proprietary protocol. Thus, a powered Ethernet system may be produced by retrofitting an existing system.

Protocols such as the Ethernet protocol are often used to communicate between devices, such as components of a computer network. Ethernet uses a bus or star topology and supports data transfer rates of 10 Mbps. Ethernet handles simultaneous demands using a technique known as carrier sense multi-access with collision detection ("CSMA/CD"). The Ethernet specification served as the basis for the IEEE 802.3 communication standard, which specifies the physical and lower software layers. The IEEE 802.3 standard controls the implementation of the basic Ethernet hardware technology. In specific terms, it controls the media access control sublayer and the physical layer functions for a bus-structured local area network that uses CSMA/CD as an access protocol.

One of several adaptations of the Ethernet (IEEE 802.3) standard for Local Area Networks (LANs) is 10 Base-T. The 10 Base-T standard (also called Twisted Pair Ethernet) uses a twisted-pair cable with maximum lengths of 100 meters. The cable is thinner and more flexible than the coaxial cable used for the 10 Base-2 or 10 Base-5 standards. Cables in the 10 Base-T system connect with RJ-45 connectors. A star topology is common, with 12 or more computers connected directly to a hub or a concentrator. The 10 Base-T system operates at 10 Mbps and uses baseband transmission methods.

A networking standard that supports data transfer rates up to 100 Mbps (100 megabits per second), called 100 BASE-T, is based on the older Ethernet standard. Because it is 10 times faster than Ethernet, it is often referred to as Fast Ethernet. Officially, the 100 BASE-T standard is IEEE 802.3 u.

Information is communicated on the Ethernet using electrical signals. The standard Ethernet protocol specifies the physical layer characteristics of these signals. This information is converted to digital information by the Ethernet devices.

The Ethernet protocol typically employs a first pair of wires for transmission in one direction and a second pair of wires for transmission in the opposite direction. The pairs of wires generally are not used to power the devices. Associated with the Ethernet protocol is a well-developed collection of standard hardware and software components that may be used to implement communications between devices.

The powered Ethernet connection 115 provides a connection for powering and communicating with remote field devices using standard, or slightly modified, Ethernet hardware and software. The connection 115 may employ either one or two pairs of wires.

Figure 2:
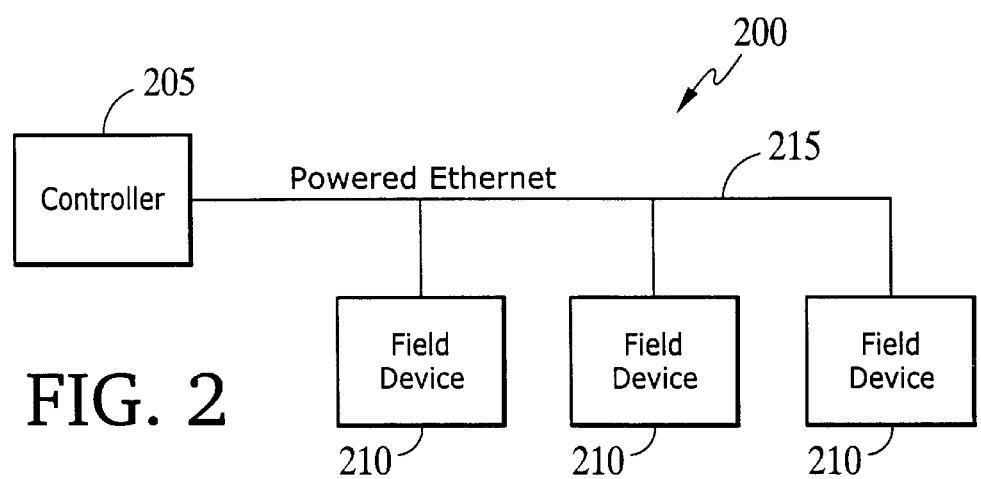
Figure 3:
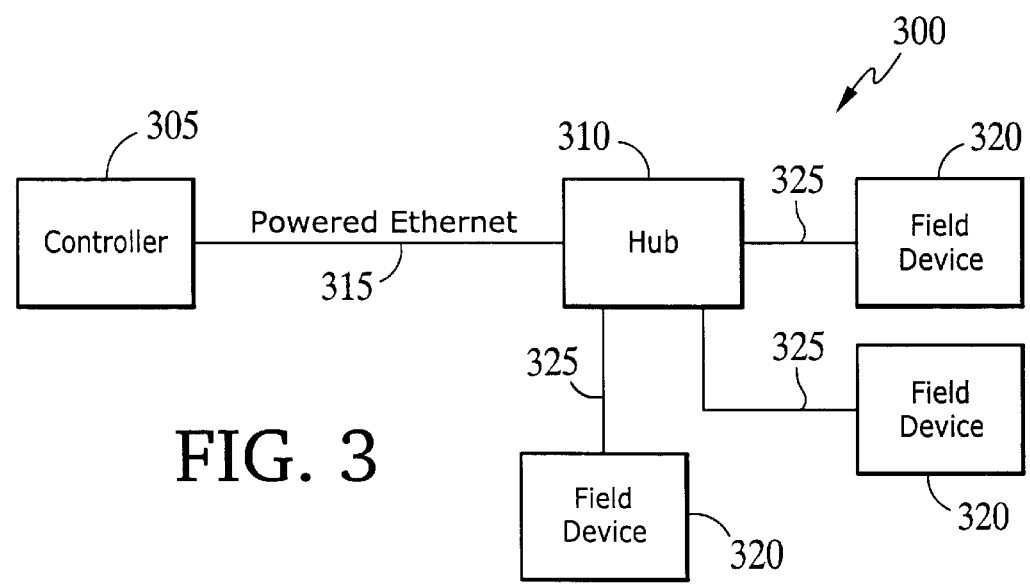

FIGS. 2 and 3 illustrate examples of other system topologies. As shown in FIG. 2, a system 200 includes a controller 205 connected to a collection of field devices 210 by a powered Ethernet connection 215 in a bus configuration. The connection 215 may employ either one or two pairs of wires.

Similarly, FIG. 3 shows a system 300 that includes a controller 305 connected to a hub 310 by a powered Ethernet connection 315. The hub 310 is then connected to a collection of field devices 320 by powered Ethernet connections 325 in a star configuration.

Each of the connections 315, 325 may employ either one or two pairs of wires, and different connections may employ different numbers of pairs. For example, the connection 315, which is typically substantially longer than the connections 325, may employ a single pair of wires, while one or more of the connections 325 employs two pairs of wires. Exemplary single-pair (two-wire) and double-pair (four-wire) systems are discussed in detail below.

Four-Wire System

Figure 4:
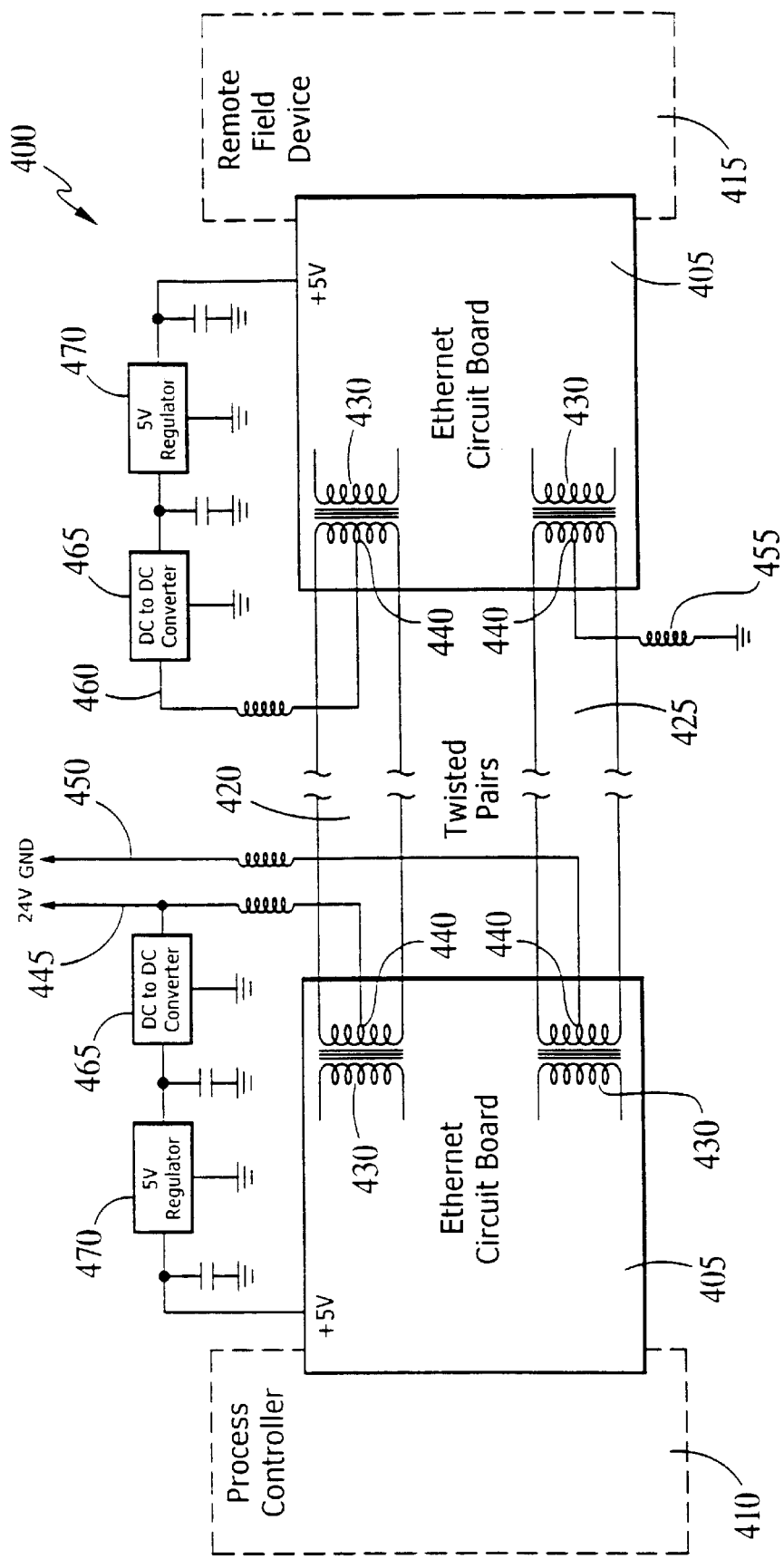
FIGS. 4 and 5 are block diagrams of systems for providing power to a field device over a four-wire Ethernet connection.

Referring to FIG. 4, a system 400 employs standard Ethernet boards 405 at both a process controller 410 and a remote field device 415. The boards communicate via two pairs of wires, with the first pair 420 providing communications from the process controller to the field device, and the second pair 425 providing communications from the field device to the process controller.

Each Ethernet board includes a pair of transformers 430, with each transformer being associated with a pair of wires. At the process controller, a 24 Volt DC power signal from a power supply 435 is injected to central taps 440 of the primary coils of the transformers. The positive (+V) lead 445 of the DC power signal is provided at the central tap of the primary coil of one of the transformers. The ground (GND) lead 450 of the DC power signal is provided at the central tap of the primary coil of the other transformer.

At the field device, the central tap 440 of the primary coil of one of the transformers 430 serves as device ground 455. The central tap 440 of the primary coil of the other transformer 430 provides a device operating power signal 460. The signal 460 and ground 455 are provided to a DC-to-DC converter 465 that reduces and isolates the DC voltage to provide operating power for the device. For optimum power transfer, the coil of the DC-to-DC converter can be impedance matched to the resistance of the wire pairs. The output of the DC-to-DC converter is provided to a voltage regulator circuit 470 that provides power to the Ethernet board and the field device. The process controller also may include a DC-to-DC converter 465 and a voltage regulator circuit 470 for use in powering the Ethernet board of the process controller. These elements are unnecessary when the process controller has a separate power supply.

Only one remote field device 415 is shown in FIG. 4. However, as illustrated in FIGS. 2 and 3, nothing precludes having more devices connected at the far end of the Ethernet wire pairs. The only requirements are that the loads of the devices must be designed so that the wire pairs are properly terminated and that the total power delivered is sufficient to drive all of the devices. Since only one remote device is active at a time, the power requirement will be the sum of the requirements of the one active device and N–1 idle devices, where N is the number of devices connected to the wire pair.

The transformers include primary coils connected to the twisted pairs and secondary coils connected to devices on the Ethernet boards. The secondary coils of the transformers may be constructed of bi-filar coils to reduce the required size of the transformers.

Figure 5:
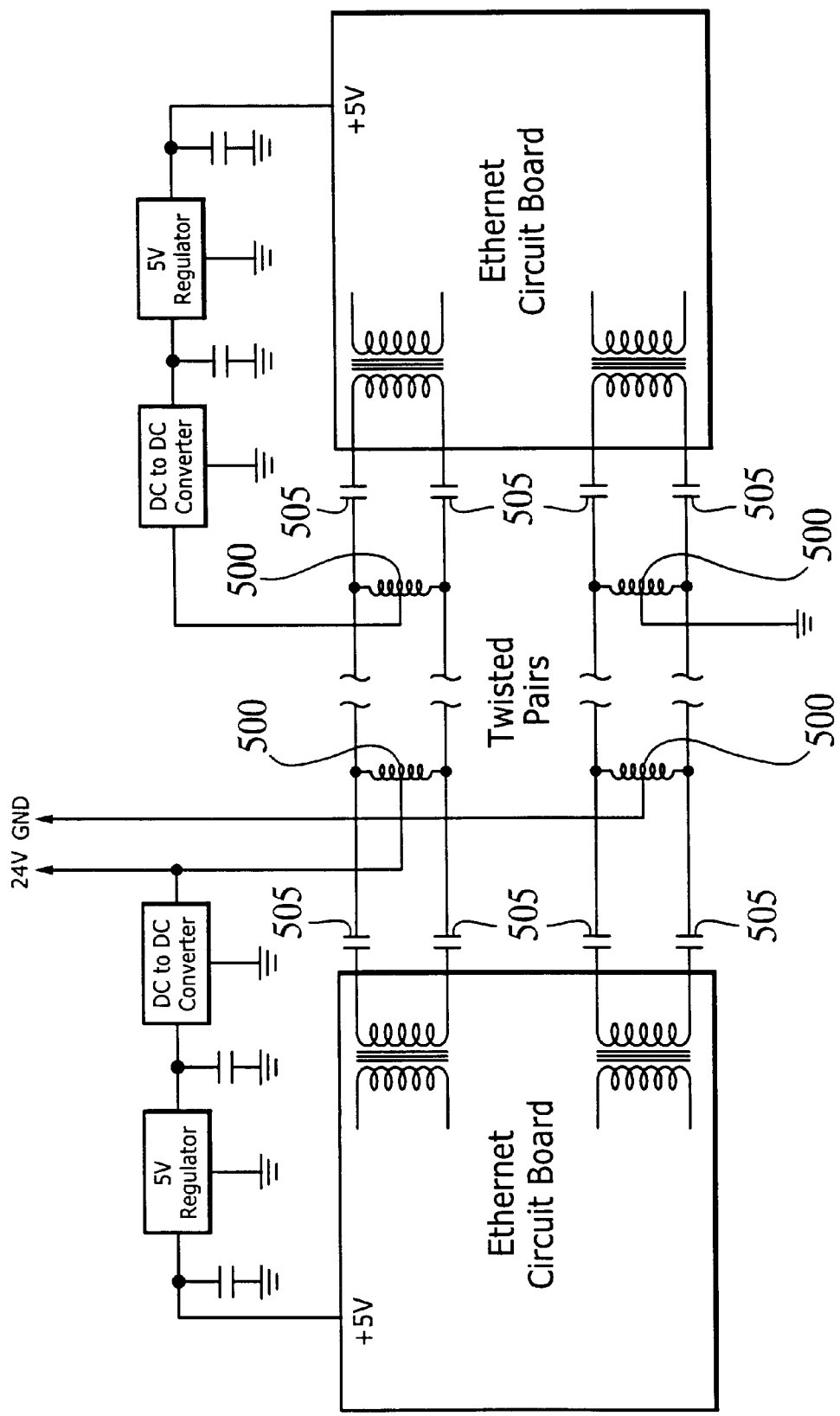

Referring to FIG. 5, for transformers that cannot carry the required DC current or don't have center taps in their primary coils, the power can be applied via center-tapped inductors 500 connected across the secondary coils of the transformers. The DC current is isolated from the transformers by capacitors 505. Each inductor must be large enough that it does not degrade the termination impedance of its corresponding wire pair.

Figure 6:
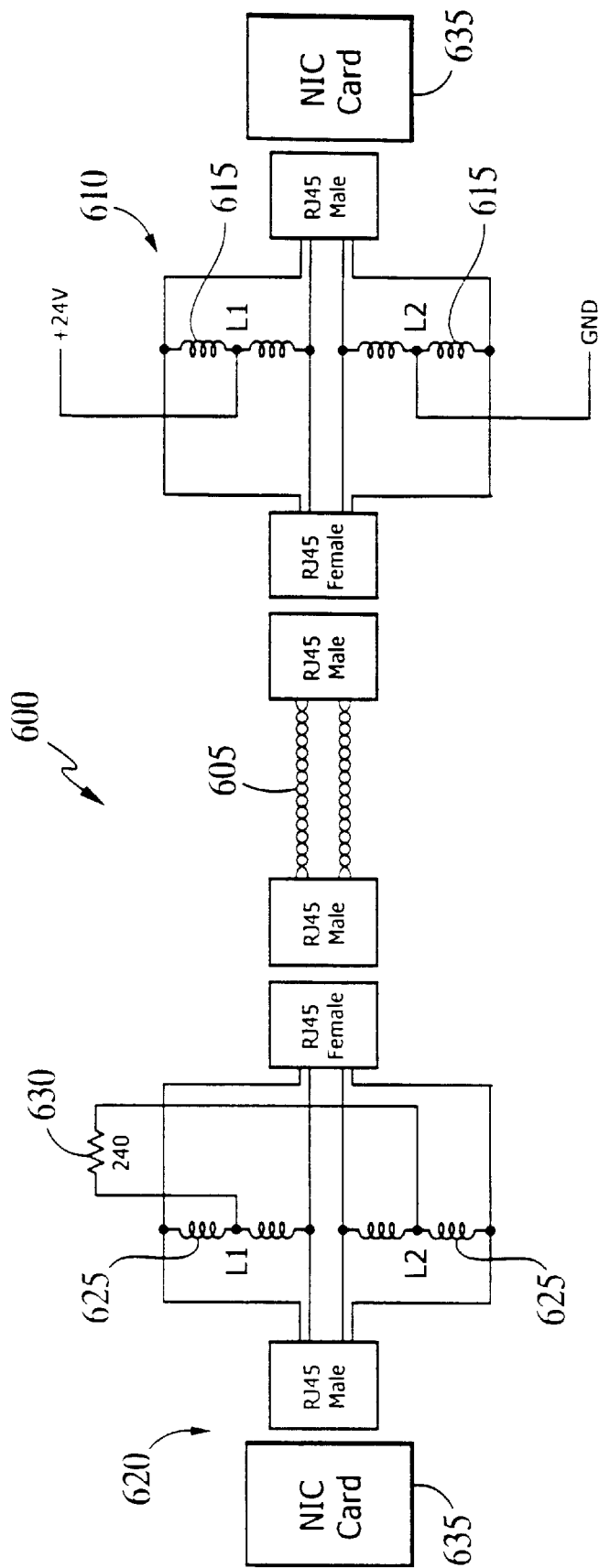
FIG. 6 is a circuit diagram of a four-wire circuit.

FIG. 6 illustrates a fairly simple prototype circuit 600 for powering a four-wire connection 605. At the process controller end 610, center-tapped inductors 615 are used to direct power on to the connection 605. At the field device end 620, center-tapped inductors 625 are used to remove power from the connection 605. With the circuit shown in FIG. 6, a 24 volt signal was applied to the connection 605 at the process controller side and about 100 mA was drained through a resistor 630 on the field device end, resulting in power consumption of 2.5 watts. The two ends were implemented using NIC cards 635 mounted in personal computers. No attempt was made to actually power any part of the NIC cards. The loop was about six feet long, which is much shorter than many contemplated implementations. The prototype circuit confirmed that power can be successfully injected into an Ethernet connection without jeopardizing the communications capability of the connection.

Two-Wire System

Figure 7:
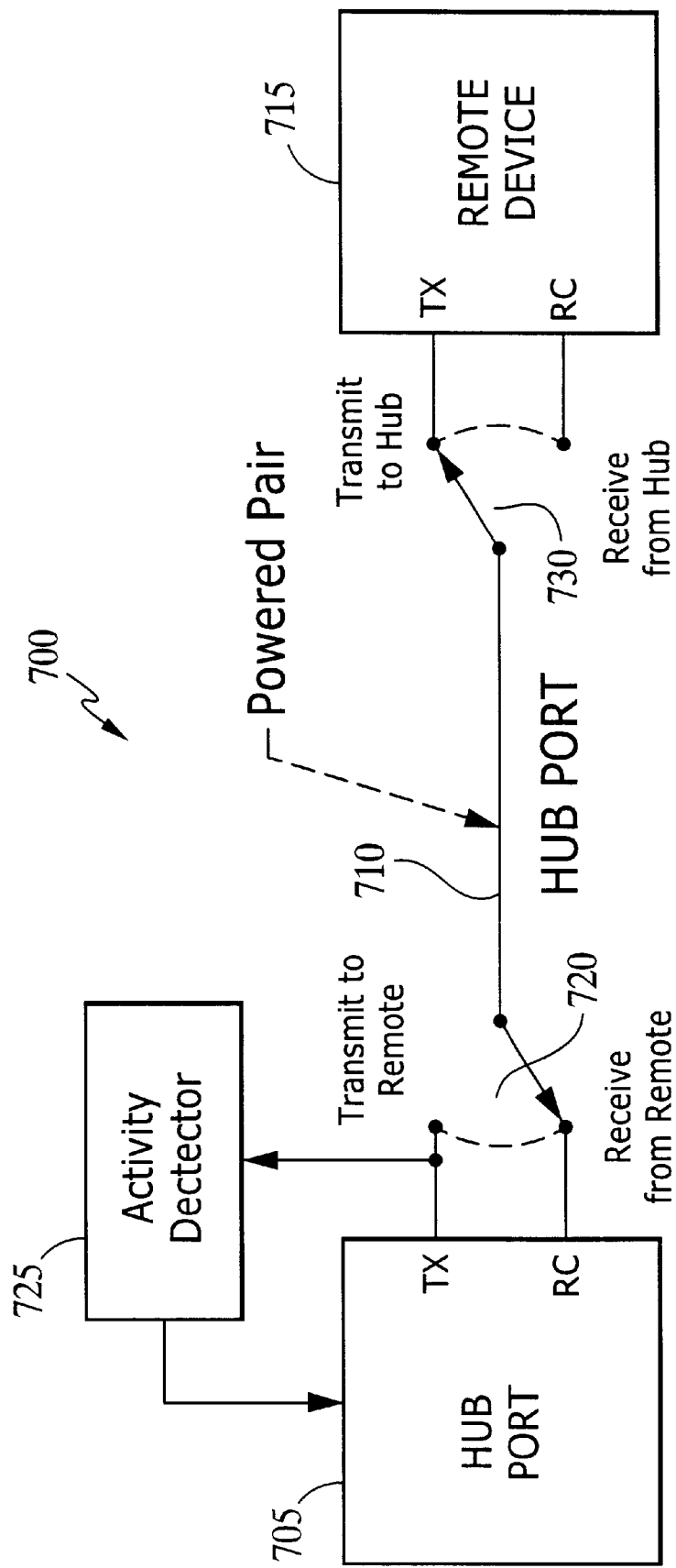
FIG. 7 is a block diagram of a system for providing power and emulating a four-wire Ethernet connection using only a single pair of wires.

Referring to FIG. 7, a system 700 having a two-wire connection may be used to emulate a four-wire, powered Ethernet connection. This approach is particularly useful in retrofitting Ethernet to existing systems that use only a single pair of wires to provide power and communications between a process controller and a remote field device. In particular, this approach may be used to make Ethernet connections without upgrading or replacing existing wires.

The system 700 includes a hub port 705 connected by a single pair of wires 710 to a remote field device 715. Each connection includes the hub port 705, a switch 720 connected between the port and the hub end of the single pair of wires 710, an activity detector 725 connected to the switch 720, and a switch 730 connected between the other end of the pair of wires and the remote field device. Each switch functions as a double pole, double throw switch, and may be implemented with a driver and receiver that can be enabled or disabled by means of a chip select lead. The switches control their associated devices to be in reception states or transmission states.

Figure 8A:
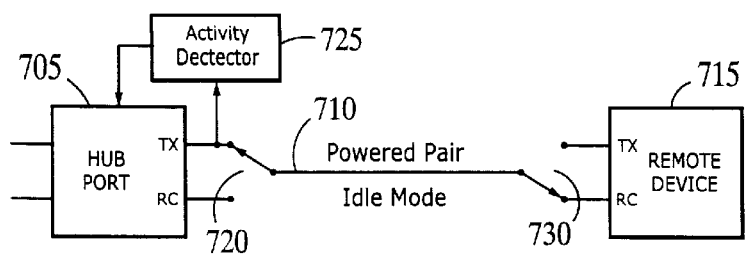
FIGS. 8A–8F are block diagrams of different operating states of the system of FIG. 7.

Referring to FIG. 8A, the remote field device 715 and an associated hub port 705 operate in an idle mode when no traffic is present on the wire connection between them. The hub switch 720 is switched to the transmit position and the remote field switch 730 is switched to the receive position. In this mode, the remote field device can determine if the network is clear.

Figure 8B:
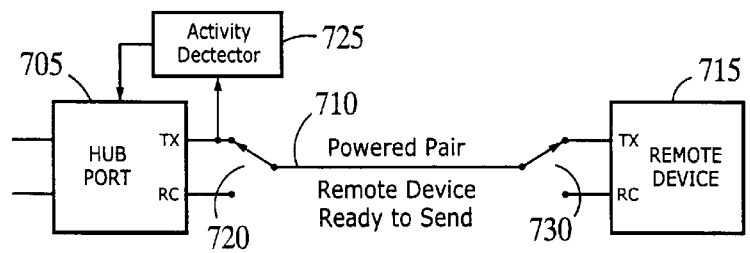

Referring to FIG. 8B, when the field device 715 is ready to send data, the field device 715 switches the switch 730 to the transmit position under control of the Ethernet remote physical layer. This connects the field device to the hub activity detector 725. The activity detector 725 detects the first part of the output signal of the remote device 715.

Figure 8C:
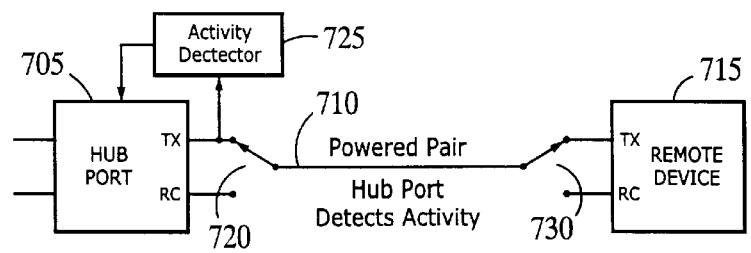

Referring to FIG. 8C, once the hub's activity detector 725 detects activity, it switches the switch 720 to the receive position to connect the transmitting field device to the transmit pair of the hub. There may be several bits of transmission lost during this transition. However, this causes no problem since the first 64 bits of the Ethernet packet are only used for synchronizing clocks.

Figure 8D:
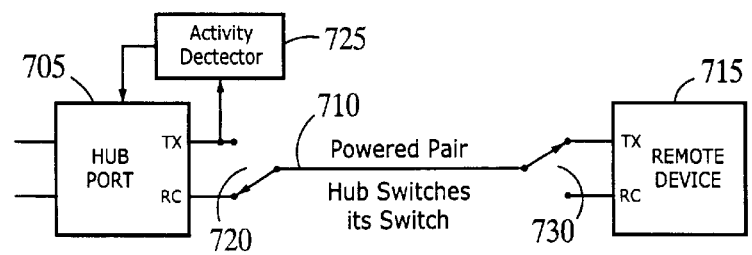

Referring to FIG. 8D, once the hub starts receiving data, the hub generates a signal to the other remote field devices to notify them that the system is busy so that they will not start to send data of their own.

Figure 8E:
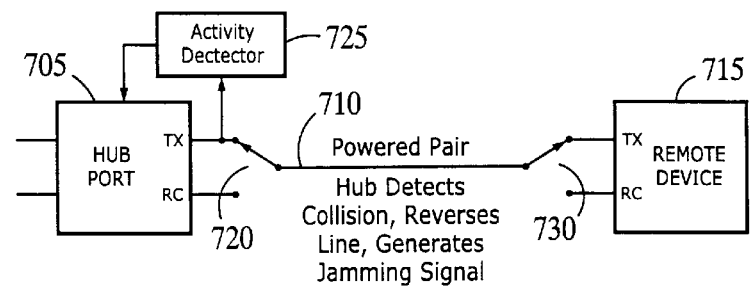
Figure 8F:
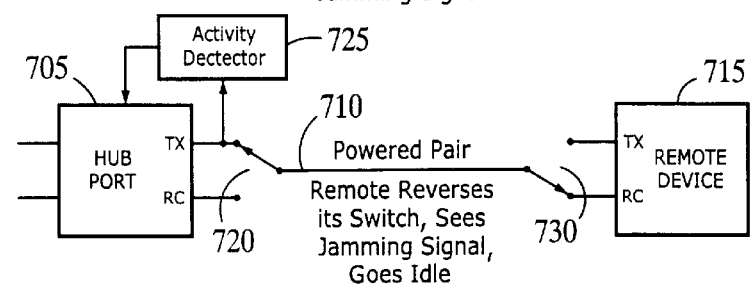

Referring to FIG. 8E, the hub may detect a collision when it receives a signal on its receive pair from another remote field device connected to it. It must then signal to the remote field devices that a collision has occurred. This can be done in several ways. One simple way is to reverse the polarity of the DC power supplied to the field devices. The field devices may be configured to automatically switch their switches to the receive positions in response to this polarity reversal, as shown in FIG. 8F. The transmitting field devices will then see the jamming signal on their receive inputs, will stop transmitting, and will initiate a backout sequence to resolve the collision.

Hub

Figure 9:
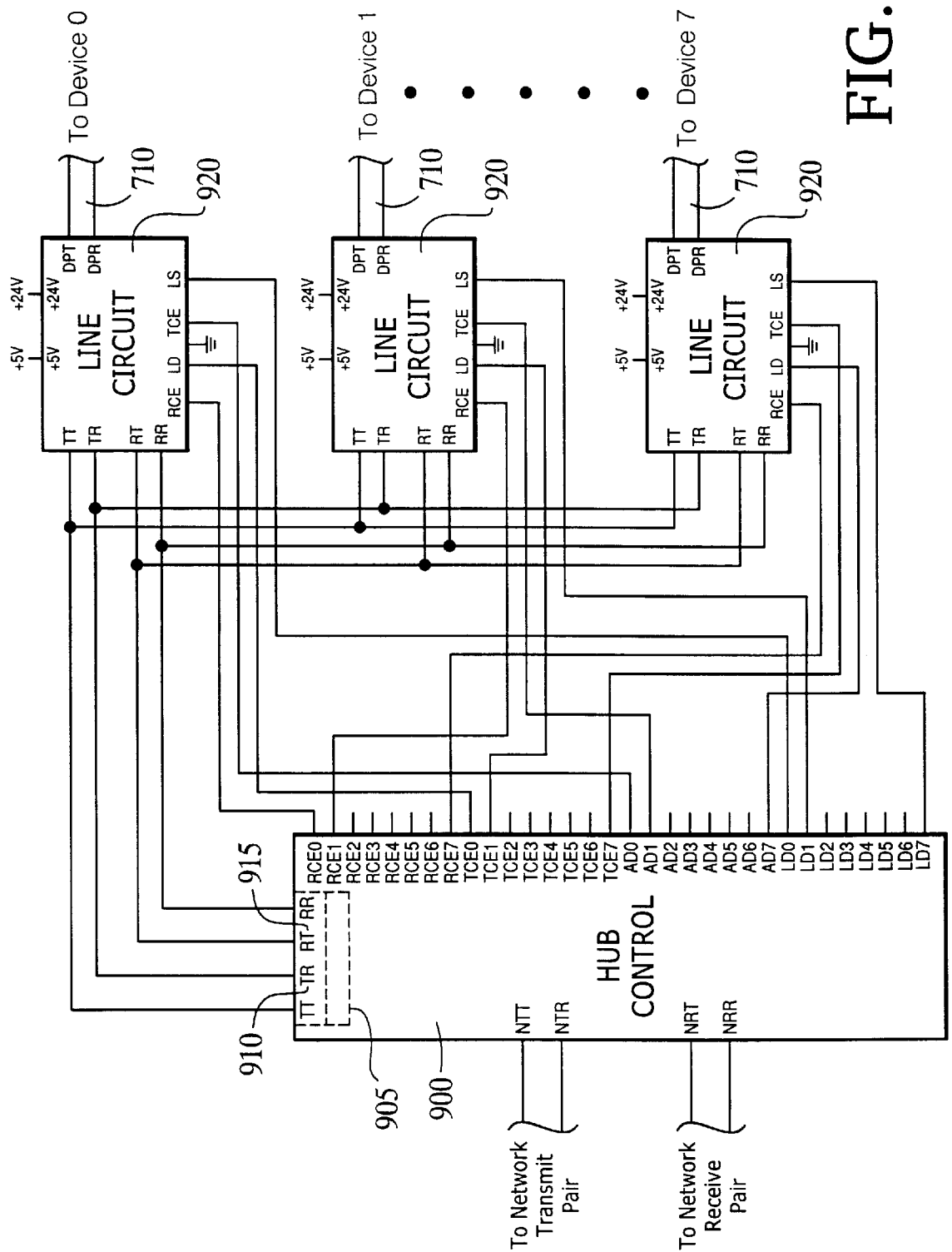
FIG. 9 is a circuit diagram showing connections of a hub using two-wire powered Ethernet.

Referring to FIG. 9, an eight-port, standard Ethernet hub 900 includes ports 905, each of which includes a two-wire transmit connection 910 that receives data transmitted by a remote device 715 and a two-wire receive connection 915 that sends data to be received by the remote device 715. A two-wire powered Ethernet connection is provided by inserting a line circuit 920 between a hub port 905 and a two-wire connection 710 to a remote device 715. This permits the use of standard Ethernet hubs to provide powered connections to remote devices over only a single pair of wires.

Figure 10:
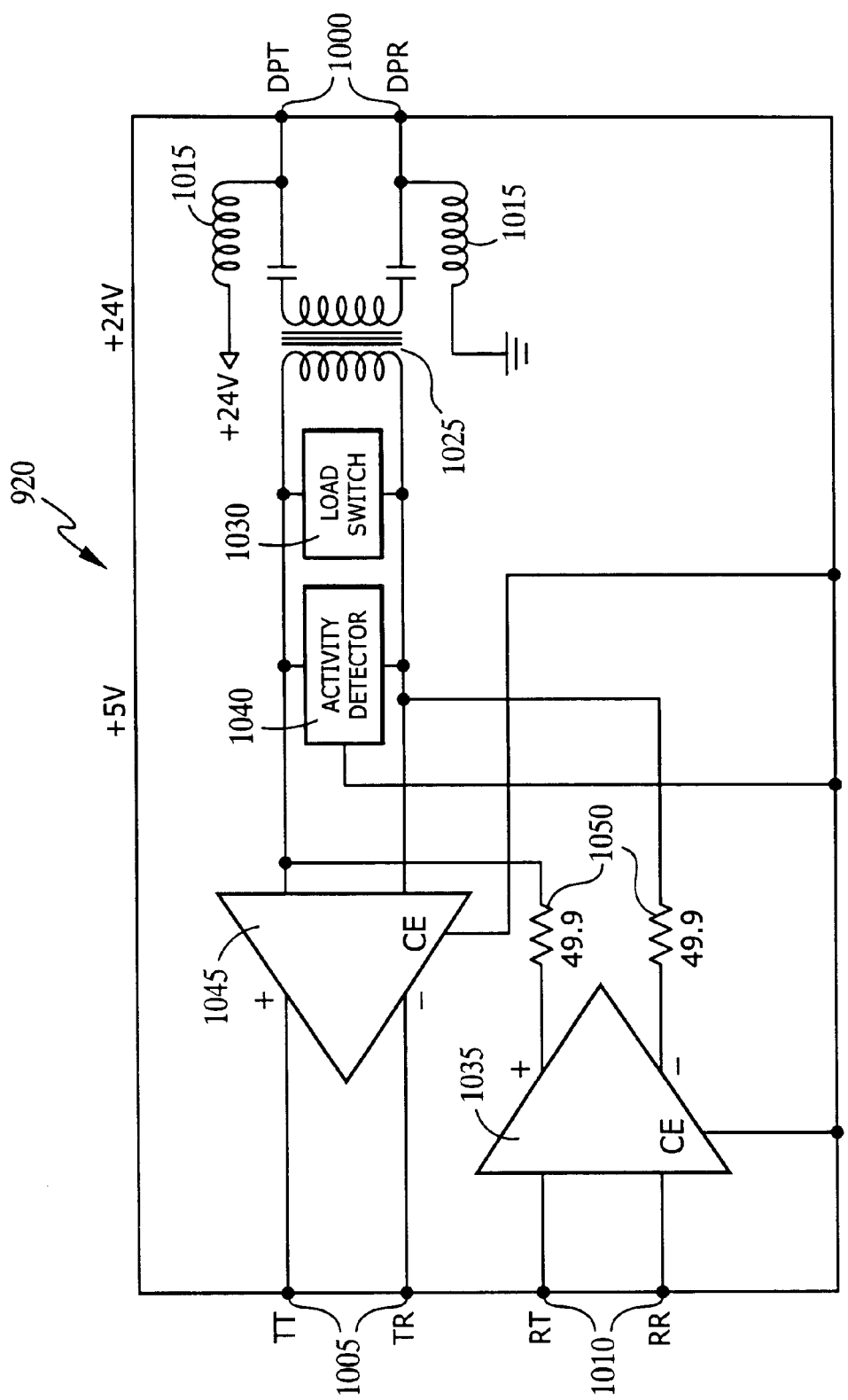
FIG. 10 is a circuit diagram of a line circuit of the circuit of FIG. 9.

Referring to FIG. 10, each hub port line circuit 920 includes a first pair of terminals 1000 connected to the two-wire connection 710, a second pair of terminals 1005 connected to the transmit connection 910, and a third pair of terminals 1010 connected to the receive connection 915. Power is supplied to the terminals 1000 by a 24 Volt source connected to the terminals through inductors 1015 or other high impedance devices. Capacitors 1020 serve to isolate the power from a transformer 1025, the secondary coil of which is connected through the capacitors 1020 to the terminals 1000.

A load switch 1030 is connected across the primary coil of the transformer 1025. The load switch 1030 is controlled by the hub to provide impedance matching. When the hub port is in the receive mode, the load switch 1030 connects a load impedance across the line so that the line is properly terminated. When the hub port is in the transmit mode, the load switch removes the load since a transmission driver 1035 provides the terminating impedance.

An activity detector 1040 also is connected across the primary coil of the transformer 1025. As discussed above, the activity detector 1040 detects transmissions by the remote device and notifies the hub to permit the hub to reconfigure the line circuit 920. The activity detector can be implemented in a number of ways. One simple implementation rectifies the signal produced by the primary coil of the transformer 1025 and compares the rectified signal to a threshold that indicates that a signal is present.

A receiver 1045 is connected across the primary coil of the transformer 1025. Outputs of the receiver 1045 are connected to the pair of terminals 1005. The receiver 1045 is controlled by a signal (TCE) from the hub.

Outputs of the transmission driver 1035 are connected through resistors 1050 to the primary coil of the transformer 1025. The resistors 1050 may be used to provide a 100 ohm driving impedance. Inputs of the transmission driver 1035 are connected to the pair of terminals 1010. The transmission driver 1035 is controlled by a signal (RCE) from the hub.

Two-Wire System—Details

As discussed above with reference to FIG. 7, a powered, two-wire 10 MHz half duplex Ethernet communications system may be used to transmit Ethernet packets as well as DC power to remote field devices. This permits existing 4–20 mA loop-powered remote field devices to be upgraded to intelligent field devices using their existing 4–20 mA twisted pair current loop cabling. This eliminates the substantial expense of replacing existing current loop wiring to upgrade the customer's cable to UTP Category 5 Ethernet wire.

To understand how the two-wire powered Ethernet communication system operates, it is useful to understand how conventional 10 BaseT Ethernet operates. To this end, three conventional Ethernet configurations are considered below: (1) point-to-point communication, (2) multi-point communication through an Ethernet hub, and (3) multi-point communication through an Ethernet switch.

Point-to-Point

The first configuration examined was a two-wire powered Ethernet point-to-point connection that involved two NIC cards connected together via a cable that was cut in half so that the two pairs of the cable could be connected together. With the two pairs shorted together, the NIC cards were put in the full-duplex mode so that a card that received its own signal would not interpret the signal as a collision and shut down. The two cards communicated with each other, by "pinging" each other continuously. Pinging is simply sending a message with an address of a device. If the device is up and connected, it sends an acknowledgement.

This configuration used two standard NIC cards from SMC installed on two standard personal computers running Windows NT. The PHY chip on the SMC NIC cards is the Altima AH101 single port chip. As noted above, the TX output of each NIC card was connected to its RX input to reduce the channel from four wires down to two. Both cards were set to 10 MHz, full-duplex operation in Windows NT using the NIC cards' standard driver software. This setting did not allow the two NIC cards to perform auto-negotiation, which would have caused communications to fail. In addition, the cable was a short run (approximately 10 ft.) of Category 5 unshielded twisted pair.

No hardware changes were made to the NIC cards themselves. The two wire connection of the TX pair to the RX pair was made external to the NIC card on a small adapter board. In addition, no power was sent during initial testing.

DC power was later introduced into this configuration using several discrete analog components. These modifications were added to the external adapter board. Additions made to the adapter boards to superimpose DC power into the two-wire cable included using inductors to couple DC power on to the two-wire composite pair, while adding capacitors to AC couple the high speed Ethernet signals to the wires. Ten volts of DC power was applied to one adapter board and was sent across a short run of Category 5 unshielded twisted pair to the other adapter board on which was mounted a 10 Ohm, 10 Watt power resistor. With 10 volts sent across the two-wire composite pair, a current of 100 mA was delivered to the resistor, which resulted in a total of 1 Watt being sent across the cable, simultaneous with Ethernet signal information (i.e., pinging) being sent between the two NIC cards.

Multi-point with Hub (No Modifications to Hub)

The second configuration, which proved unsuccessful, employed a standard NIC card connected to a standard hub and back to a standard NIC card. The configuration included one NIC card, again the SMC 9432 NIC card using the Altima AH101 PHY chip, connected in two-wire mode via UTP Category 5 cable to one port of a standard low cost single board Ethernet hub. Another 9432 NIC card (in another computer) was interfaced in standard Ethernet 4 wire mode via a short run (10 ft.) of UTP Category 5 cabling to another port of the Ethernet hub. When tested, this configuration failed because the hub is always a half duplex only device.

When a hub is connected in two-wire mode to some other two-wire Ethernet device, such as a NIC card, the TX output of that particular hub port may be directly connected to the RX input of that same port. Therefore, when the hub transmits out of one of its ports in two-wire mode, the TX output data is immediately received by the corresponding RX input. When a device, such as a hub, operates in half duplex mode, it can only receive when it is not transmitting and it can only transmit when it is not receiving. That is the definition of half duplex operation. Full duplex operation, on the other hand, allows a device to transmit and receive simultaneously, which is why it needs four wires. When a half duplex device receives a packet while it is transmitting, it considers this to be a collision, which is a violation of the half duplex mode of operation. The generic response of a half duplex device to a perceived collision is to immediately terminate whatever it was transmitting when something came in on its RX input, ignore the packet it is receiving on RX, generate a "jam" signal on its TX output, and then time out for some random period of time before trying to re-transmit the packet it was sending when the collision occurred. However, when it tries to re-transmit the packet, it again immediately senses the packet on its RX input, and again goes into collision response mode. This sequence of events continues indefinitely whenever the hub tries to transmit an Ethernet packet, which means that no useful information is transmitted as long as TX is connected to RX. Therefore, without hardware or firmware modifications, a standard half-duplex, off-the-shelf hub cannot be used for two-wire Ethernet communication in a system. This problem is avoided by using a hub that functions in full duplex mode.

Multi-Point With Switch (No Hardware Modifications Made to Switch)

A third configuration used a standard NIC card interfaced to a port of a high performance Cisco switch in two-wire mode and another NIC card interfaced to the switch via another switch port in four-wire mode with no modifications made to the switch's hardware. (Changes were made to the switch firmware via the software control console on the switch.) The NIC-card-to-Cisco switch two-wire interface failed because the switch could not properly perform a needed operational function called auto-negotiation with a two-wire cable. The problems can be avoided by directing the switch to not auto-negotiate with the NIC in two-wire mode and to disregard anything it receives on its RX input when it is transmitting out of TX on its two-wire interface.

Multi-point with Switch (Modifications Made to Switch)

A variation on the previous configuration used a low cost, single board, ADMtech switch of simple construction, made with three major VLSI components and other low cost discrete chips and components. The switch was modified by adding one low cost HC chip and a resistor to the board. The rest of the experimental configuration was the same as that for the previous configuration. In particular, one NIC card was interfaced to the switch in two-wire mode-on one switch port, while a second NIC card was interfaced to the switch via another port in four-wire mode.

This configuration worked correctly and as designed because the modification to the switch prevented the switch from paying attention to packets being immediately received on the two-wire port when the TX output was transmitting out (the usual two-wire mode transmission problem). The other reason this worked is because the switch was configured during hardware setup to auto-negotiate with the NIC before it saw the two-wire interface. The lesson learned from this configuration is that a simple, low cost switch may be a viable candidate for use in a two-wire Ethernet system configuration, if the switch can be configured, through hardware or other modifications, to ignore packets being transmitted in each two-wire port by the corresponding RX input and, through hardware or firmware modifications, to not auto-negotiate. The hardware modification to the switch involving the 74 HC125 chip and resistor solves the problem of RX inputs ignoring transmitted TX packets. The second problem is solved by adding a boot strap serial EEPROM to the board to direct the main switch controller chip, the ADMtech AL968 chip, to not auto-negotiate.

Figure 11:
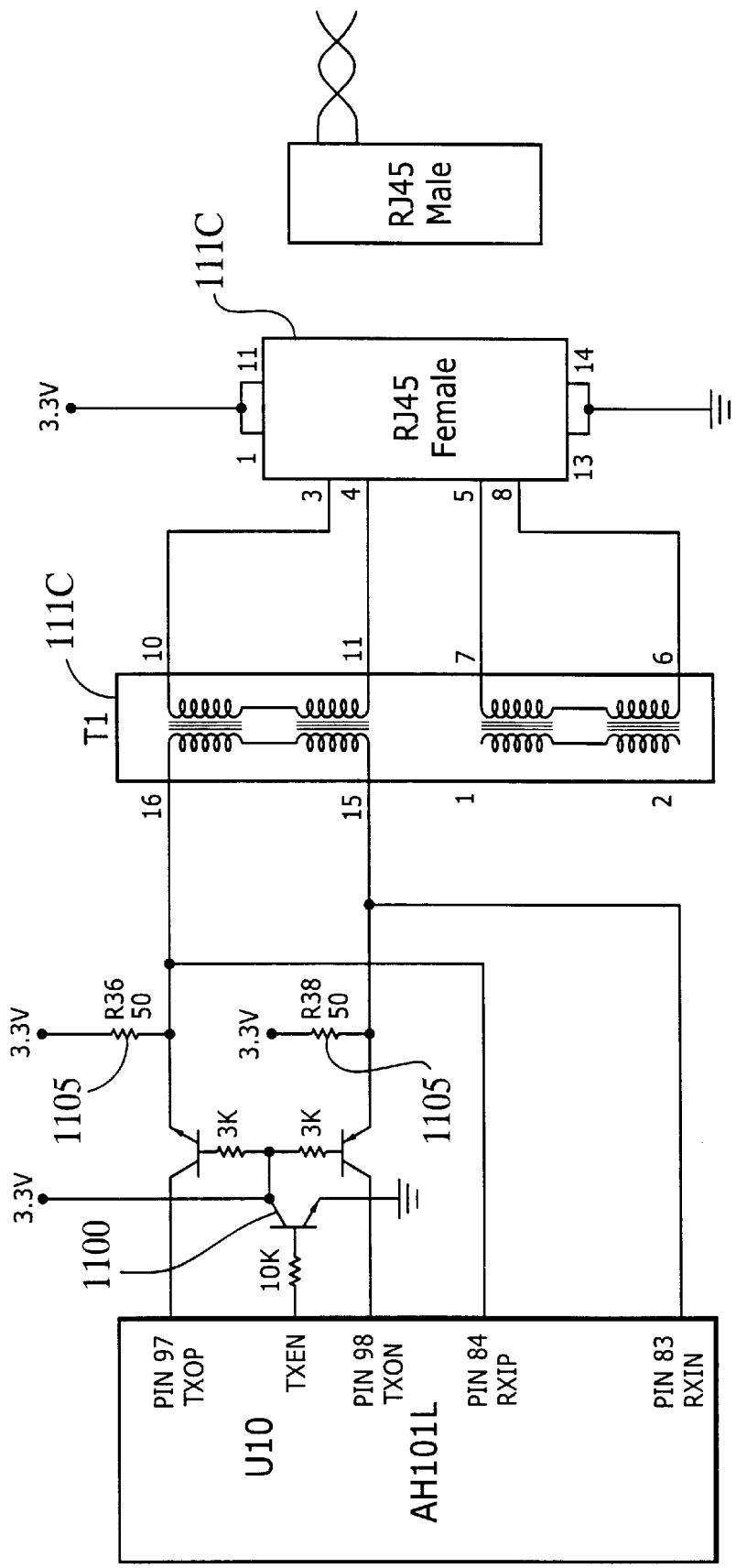
FIGS. 11–17 are circuit diagrams of elements of a two-wire circuit.

The first modification of the NIC board attempted for two-wire operation is shown in FIG. 11. The NPN transistor 1100 was turned on only when TXEN went high. This connected the two 49.9 ohm resistors 1105 to TXOP and TXON. When the TXEN lead was low, the transmit driver was disconnected from the rest of the circuit. The receive pair on the output side of the transformer 1110 was connected to the transmit pair. The transmit pair was then connected to the jack 1115 and inductors were added. This approach was unsuccessful.

Figure 12:
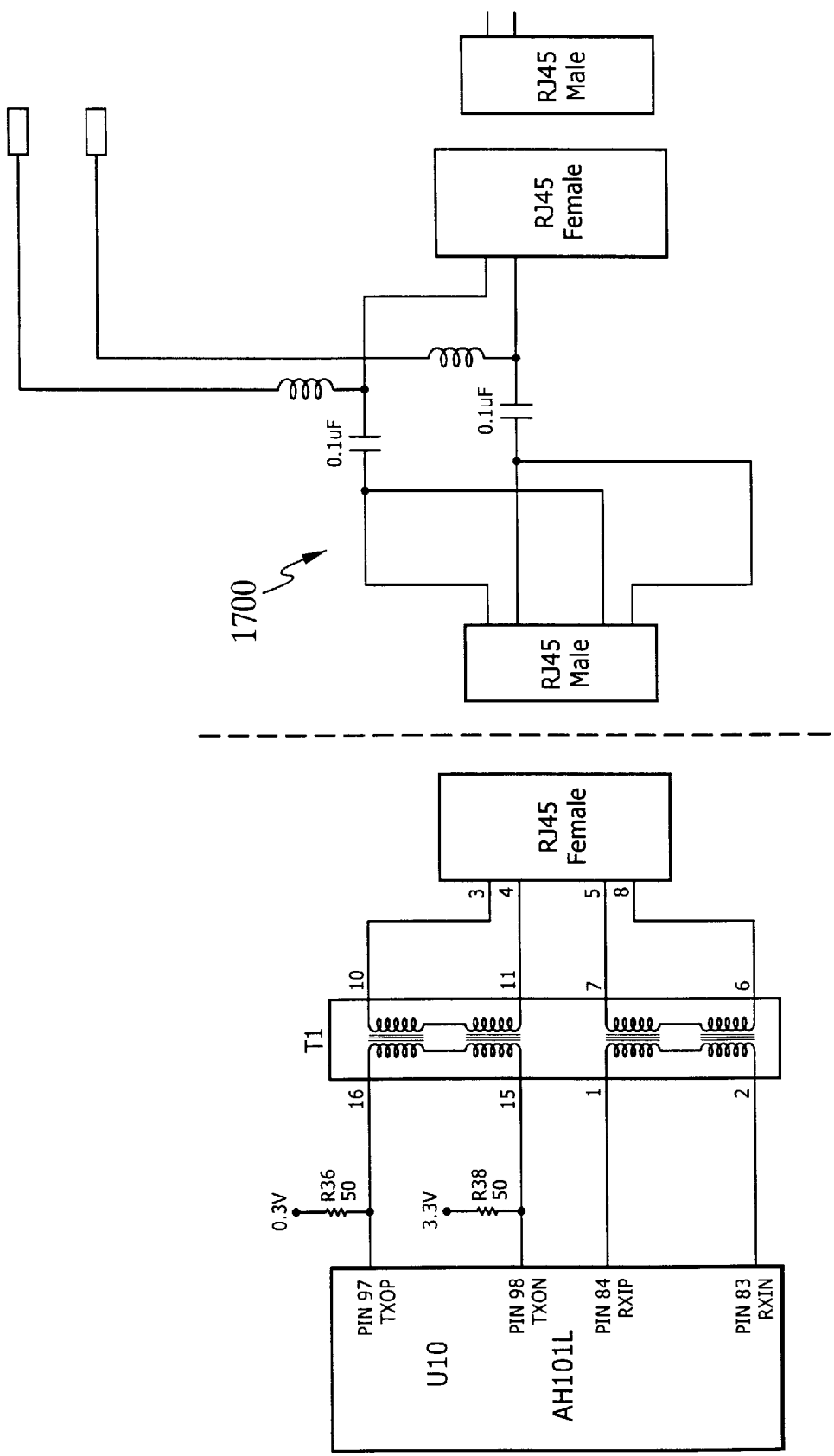

The next modification approach is shown in FIG. 12. All modifications were done to an external board 1200 that was then connected in series with the loop. This approach was successful and resulted in the two NIC cards communicating. One problem with this approach was that the terminations on the transmit and receive pairs were connected in parallel, which resulted in a 50 ohm termination instead of a 100 ohm termination. This is not important on short loops. With the setup shown in FIG. 12, 10 volts were applied to one card and a 100 ohm resistor on the other. This resulted in one watt being sent over the loop.

Figure 13:
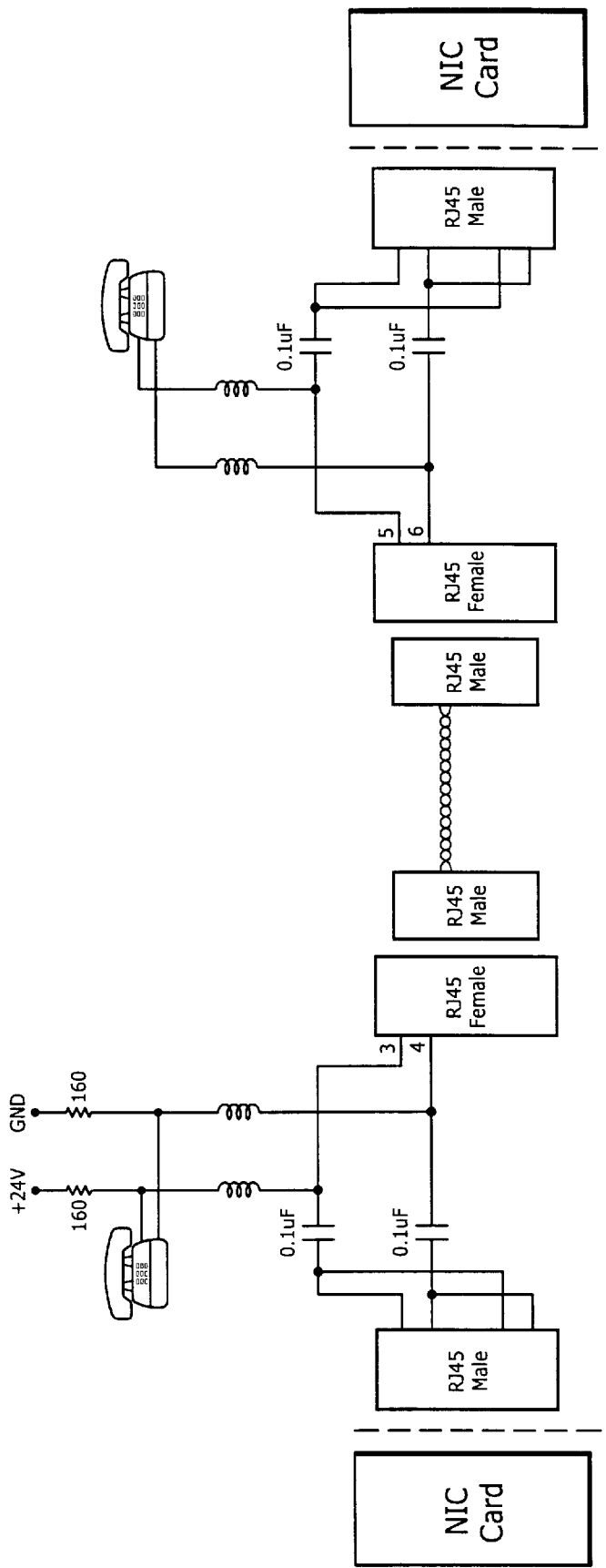

A telephone then was connected to each loop, and one end was connected to a 20-volt power supply through two 160-ohm resistors. Users were able to talk on the Ethernet loop while it was transmitting data. The circuit is shown in FIG. 13.

Figure 14:
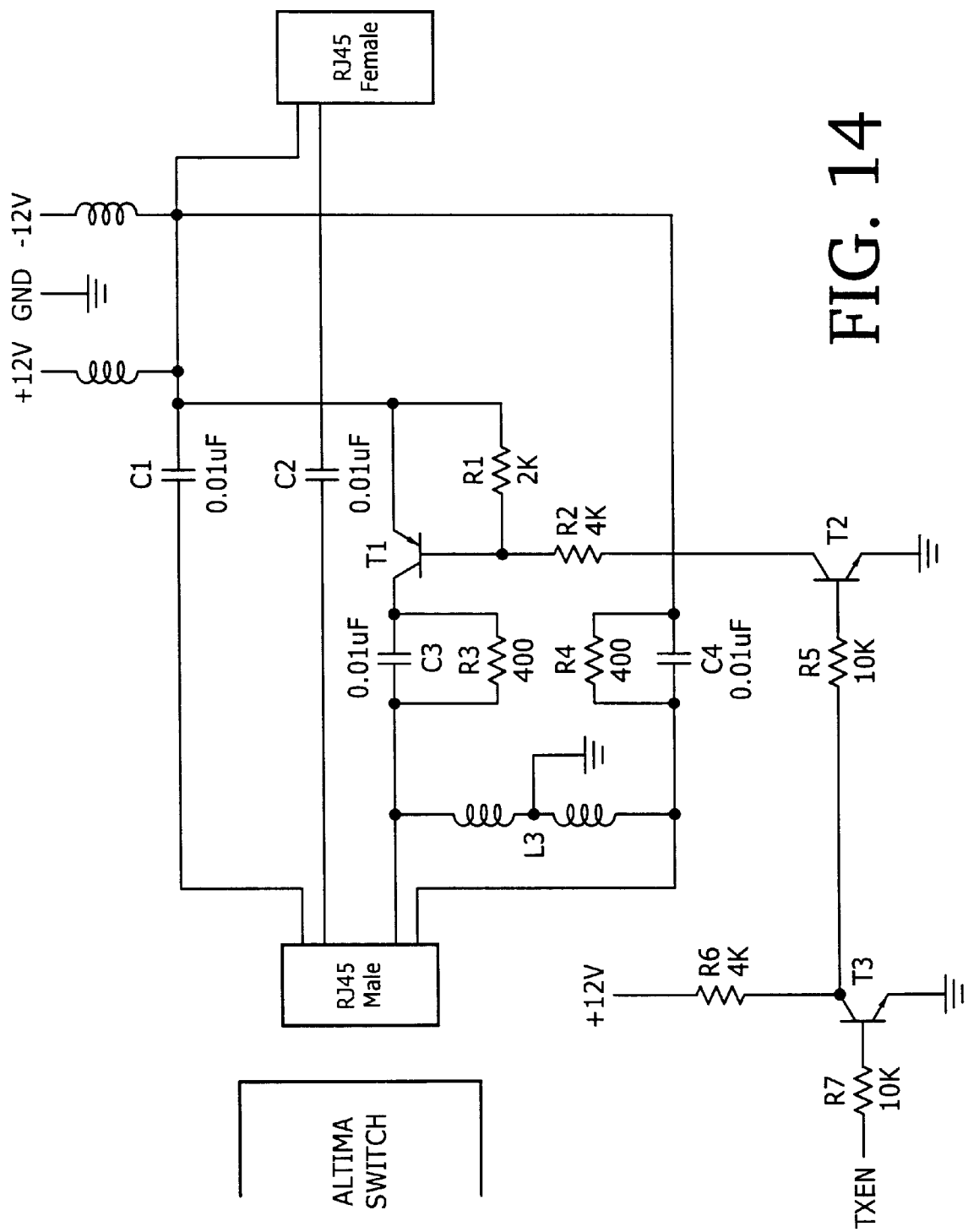

Other attempts to have the cards communicate through an unmodified Altima switch were unsuccessful. Since the Altima switch uses virtually the same physical layer, AH104L vs. AH101L, it was determined that the problem was because the switch is smarter than the NIC cards. The switch generated a table of addresses by monitoring the traffic. Once it saw its own address as the source of an incoming message, it shut down. This problem may be solved through use of a card that cuts off the receiver when the transmitter is active. Such a card is shown in FIG. 14. In FIG. 14, resistors R3 and R4 have been added to provide a DC current component since T1 is not a bipolar switch. L3 is added so that the DC current will not saturate the transformer. With this circuit, the only modification needed on the Altima switch is to tap into the TXEN signal and to pick up a ground.

Maximum Connection Distances

The maximum distance over which powered Ethernet can operate is a function of several variables. The distance can be limited by one of two factors, the power limitation and the signal strength limitation. The power limitation is in turn determined by the power a device needs, the resistance of the loop, and the maximum voltage available for use. To get the maximum distance, the DC impedance of the converter must equal the loop resistance. In general, the connection distance provided by the four-wire mode is twice that of the two-wire mode. Assuming that the voltage is restricted to 24 volts, that 26 gauge twisted pair wiring is used, and that the power requirement for the device is one watt, the loop and the device will each dissipate one watt (since, for maximum distance, the device resistance equals the loop resistance.) The DC current will be 83.3 mA, and the loop resistance will be 144 ohms. For two-wire operation this corresponds to a loop length of 1,450 feet. For four-wire operation, the length is 2,900 ft. This is sufficiently long that the limitation due to signal strength may be the controlling factor for most applications.

While physical layer chips advertise that they can support a distance of 100 meters, Altima states that they guarantee a minimum of 140 meters at 100 Mbit operation. The limit for 10 Mbit operation should be considerably longer.

Another possibility for greater signal distance is to operate at 1 Mbit. However, this would require modifications to the switch.

Full Duplex

Figure 15:
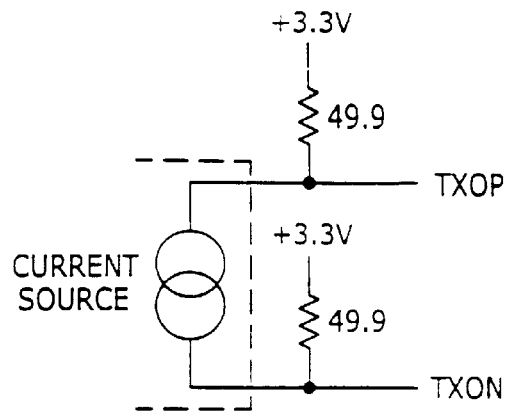
Figure 16:
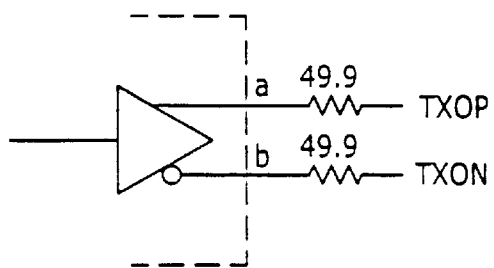
Figure 17:
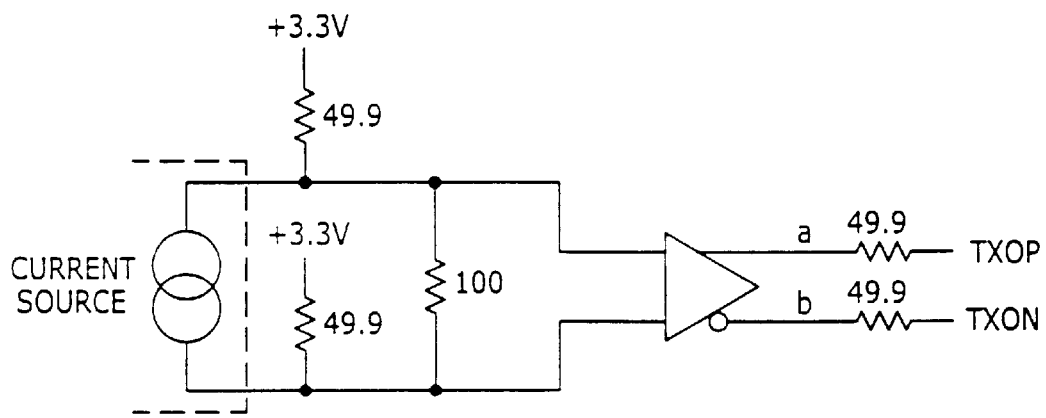

There are a number of problems with developing true full duplex over a single pair. It requires the development of a hybrid similar to those used in the telephone. A hybrid circuit requires a point where the output signal can be picked off uncorrupted by any input signal. The present physical layer chip does not provide such a point. The chip's output is from a current source that drives the line in parallel with a 100 ohm termninating resistor. This output circuit is shown in FIG. 15. If the output were as shown in FIG. 16, the desired signal could be picked off at points a and b. One way to provide full duplex operation is shown in FIG. 17. The 100 ohm resistor connected to the two 49.9 ohm resistors is required for the output to be the proper shape for Manchester encoding. The added circuit essentially doubles the power used by the output driver.

Multi-drop

Providing multi-drop capability is even more difficult than full duplex operation. To prevent reflections at the point of connection, the output driver must present an infinite output impedance (that is, it must be a pure current source). Since the signal injected in the loop will travel in both directions, the driver power will be doubled. The power supply also becomes more complicated. The power supplies on the remote devices must be designed so that they draw a constant current. Otherwise, near-end devices will draw excessive current and far end devices will not be able to operate.

Other embodiments are within the scope of the following claims.

What is claimed is:

1. A method of connecting a four-terminal Ethernet connection to a two-wire Ethernet connection, the method comprising:
   providing a device having a four-terminal Ethernet connection, the connection including a first pair of terminals for transmitting data away from the device and a second pair of terminals for transmitting data to the device;
   providing a two-wire Ethernet connection for transmitting data to and from the device;
   providing a switched connection between the four-terminal Ethernet connection and the two-wire Ethernet connection, the switched connection operating in a first mode in which the two-wire Ethernet connection is connected to the first pair of terminals and a second mode in which the two-wire Ethernet connection is connected to the second pair of terminals;
   setting the switched connection to operate in the first mode;
   monitoring the two-wire Ethernet connection for data being transmitted to the device;
   setting the switched connection to operate in the second mode upon detection of data being transmitted to the device; and
   injecting power onto the two-wire Ethernet connection at the device for use in powering another device connected to the two-wire Ethernet connection.

2. The method of claim 1, further comprising changing an impedance presented to the two-wire Ethernet connection at the device from a first impedance when the switched connection is operating in the first mode to a second impedance when the switched connection is operating in the second mode.

3. An industrial process field device for use with a powered Ethernet connection, the industrial process field device comprising:
   communications circuitry operable to exchange data with an industrial process control device over an Ethernet connection using an Ethernet protocol;
   power circuitry operable to extract operating power from the Ethernet connection; and
   process circuitry operable to:
      sense a physical condition of an industrial application and to transmit information about the sensed physical condition to the industrial process control device using the Ethernet connection; or
      control the physical condition of the industrial application in response to a process command received from the industrial process control device through the Ethernet connection.

4. The industrial process field device of claim 3 wherein the communications circuitry and the power circuitry are operable to interface with the Ethernet connection and the Ethernet connection comprises only a single pair of wires.

5. A method of providing data and electrical power to an industrial process field device, the method comprising:
   injecting an electrical power signal onto an Ethernet connection;
   transmitting the electrical power signal and control data over the Ethernet connection, the control data being generated by a control device;
   extracting the electrical power signal and the control data at the industrial process field device for an industrial application, the instrumentation device implementing an instrumentation operation using the electrical power signal;
   collecting physical data at the instrumentation device; and
   receiving the physical data at the control device via the Ethernet connection.

6. The method of claim 5 further comprising:
   generating modified control data at the control device, based on the physical data;
   transmitting the modified control data to the instrumentation device, over the Ethernet connection; and
   modifying the instrumentation operation, to thereby modify the industrial application.

7. The method of claim 5 wherein the Ethernet connection is a four-wire connection.

8. The method of claim 5 wherein injecting the electrical power signal occurs at the control device.

9. The method of claim 5 wherein injecting the electrical power signal occurs at a hub device associated with the control device.

10. The method of claim 5 wherein the Ethernet connection comprises two pairs of wires, with a first pair of wires being used to transmit data from the control device to the industrial process field device and a second pair of wires being used to transmit data from the industrial process field device to the control device.

11. The method of claim 10 wherein injecting the electrical power signal comprises applying a DC voltage across the two pairs of wires by coupling a first potential to the first pair of wires and a second potential to the second pair of wires, with the DC voltage being defined as a difference between the two potentials.

12. The method of claim 11 wherein:
each pair of wires is connected to a corresponding transformer at the first device,
each transformer includes a center-tapped primary winding, and
coupling potentials to the pairs of wires comprises applying the DC voltage between the center taps of the primary windings of the two transformers.

13. The method of claim 11 wherein:
a center-tapped inductor is connected across each pair of wires at the first device, and
coupling potentials to the pairs of wires comprises applying the DC voltage between the center taps of the inductors.

14. The method of claim 11 wherein:
each pair of wires is connected to a corresponding transformer at the second device,
each transformer includes a center-tapped winding, and
extracting the electrical power signal comprises extracting a DC voltage existing between the center taps of the windings of the two transformers.

15. The method of claim 11 wherein:
a center-tapped inductor is connected across each pair of wires at the second device, and
extracting electrical the electrical power signal comprises extracting a DC voltage existing between the center taps of the inductors.

16. The method of claim 5 wherein the Ethernet connection comprises a single pair of wires used to transmit data from the control device to the industrial process field device, to transmit data from the industrial process field device to the control device, and to provide power form the first device to the second device.

17. The method of claim 16 wherein injecting the electrical power signal comprises applying a DC voltage across the pair of wires by coupling a first potential to the first wire through an inductor and coupling a second potential to the second wire through an inductor, with the DC voltage being defined as a difference between the two potentials.

18. The method of claim 5 wherein the industrial process field device is a monitor operable to sense a process condition and to transmit information about the sensed process condition to the first device using the Ethernet connection.

19. The method of claim 5 wherein the industrial process field device is an actuator operable to control a process condition in response to a command sent from the control device over the Ethernet connection.

20. A method of providing data and electrical power to an industrial process field device, the method comprising:
injecting an electrical power signal onto a two-wire Ethernet connections;
transmitting the electrical power signal and control data over the two-wire Ethernet connection, the control data being generated by a control device;
extracting the electrical power signal and the control data at the industrial process field device for an industrial application, the instrumentation device implementing an instrumentation operation using the electrical power signal;
collecting physical data at the instrumentation device; and
receiving the physical data at the control device via the two-wire Ethernet connection.

21. The method of claim 20 further comprising:
providing a first connection for transmitting the control data;
providing a second connection for receiving the physical data;
providing a switch connected to the two-wire Ethernet connection, and operable to switch between the first connection and the second connection;
contacting the switch to the first connection when transmitting the control data; and
contacting the switch to the second connection when receiving the physical data.

22. The method of claim 21 further comprising:
detecting the physical data at the first connection; and
switching the switch from the first connection to the second connection.

23. An industrial control system comprising:
an industrial controller operable to output control data;
an Ethernet connection including at least a first pair of wires, the first pair of wires being operable to communicate both the control data and an electrical power signal; and
a monitor connected to the Ethernet connection and operable to receive the electrical power signal and the control data to thereby monitor an industrial application.

24. The system of claim 23 further comprising an actuator operable to modify the industrial application based on the control data.

25. The industrial control system of claim 23 wherein the Ethernet connection is a four-wire connection.

26. The industrial control system of claim 23 wherein the Ethernet connection is a two-wire connection.

27. The industrial control system of claim 26 further comprising:
a first connection operable to output the control data;
a second connection operable to input physical data from the monitor; and
a switch operable to switch between the first connection when transmitting the control data and the second connection when transmitting the physical data.

28. The system of claim 27 further comprising a detector operable to detect the physical data at the first connection and signal the switch to switch to the second connection.

29. The system of claim 27 wherein the first and the second connections are located at the control device.

30. The system of claim 27 wherein the first and the second connection are located at a hub port connected to the control device.

31. An industrial control system comprising:
an industrial controller operable to output control data;
an Ethernet connection including at least a first pair of wires, the first pair of wires being operable to communicate both the control data and an electrical power signal; and
an actuator connected to the Ethernet connection and operable to receive the electrical power signal and the control data to thereby actuate a process in an industrial application.

32. A method of transmitting data comprising:
outputting transmit data over a first connection;
inputting receive data over a second connection;
providing a two-wire Ethernet connection operable to transfer the transmit data and the receive data;
providing an electrical power signal over the two-wire Ethernet connection; and
switching a switch connected to the two-wire Ethernet connection between the first connection for transferring the transmit data over the two-wire Ethernet connection and the second connection for transferring the receive data over the two-wire Ethernet connection.

33. The method of claim 32 further comprising:

detecting receive data at the first connection; and signaling the switch to switch between the first connection and the second connection.

34. A data transfer system comprising:

a transmitter operable to output transmit data;

a first connection associated with the transmitter and operable to output the transmit data;

a second connection associated with the transmitter and operable to input receive data;

a two-wire Ethernet connection operable to transfer the transmit data and the receive data;

a switch connected to the two-wire Ethernet connection and operable to switch between the first connection when transmitting the transmit data and the second connection when transmitting the receive data; and a power injector operable to provide an electrical power signal over the two-wire Ethernet connection.

35. The data transfer system of claim 34 comprising:

a detector operable to detect the receive data at the first connection, further operable to signal the switch to switch between the first connection and the second connection in response thereto.

36. The data transfer system of claim 35 wherein the transmitter is associated with a control device, and further wherein the power injector is co-located with the control device.

37. The data transfer system of claim 35 wherein the transmitter is associated with a network hub device, and further wherein the power injector is co-located with the network hub device.

* * * * *